R. C. GRUWELL.
MEANS FOR CONNECTING GANG PLOWS TO TRACTORS.
APPLICATION FILED DEC. 1, 1919.
1,363,507.
Patented Dec. 28, 1920.
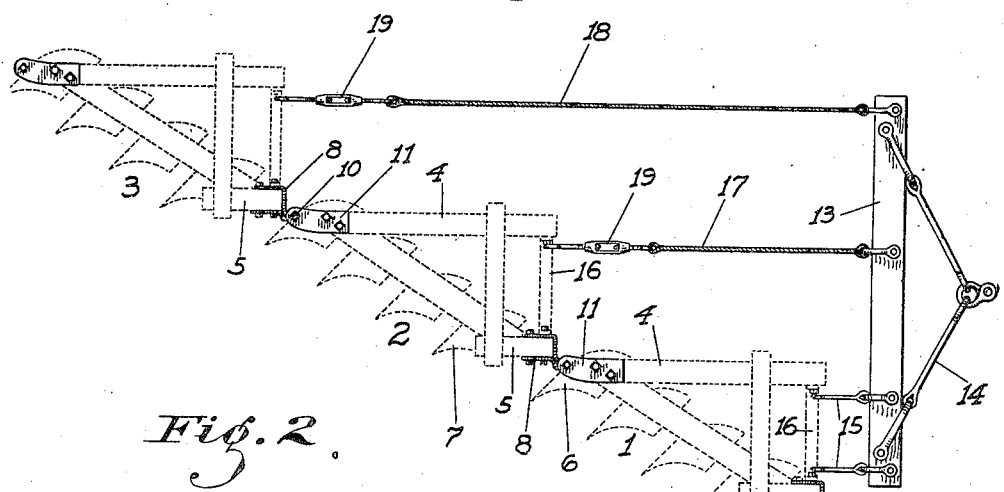
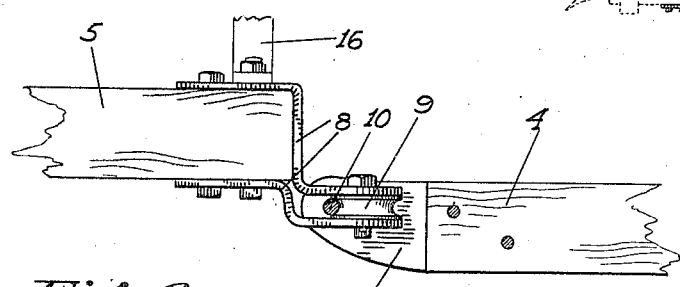
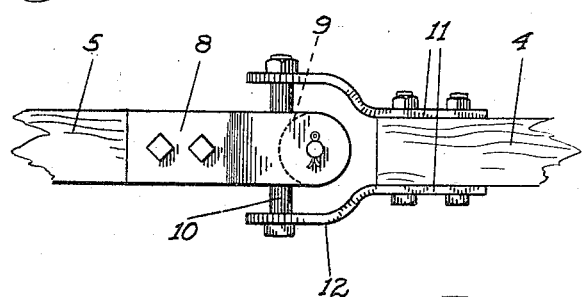
INVENTOR.
Robert C. Gruwell
BY
ATTORNEY

UNITED STATES PATENT OFFICE.

ROBERT C. GRUWELL, OF PETERS, CALIFORNIA.

MEANS FOR CONNECTING GANG-PLOWS TO TRACTORS.

1,363,507. Specification of Letters Patent. Patented Dec. 28, 1920.

Application filed December 1, 1919. Serial No. 341,731.

*To all whom it may concern:*

Be it known that I, ROBERT C. GRUWELL, a citizen of the United States, residing at Peters, county of San Joaquin, State of California, have invented certain new and useful Improvements in Means for Connecting Gang-Plows to Tractors; and I do declare the following to be a full, clear, and exact description of the same, reference being had to the accompanying drawings, and to the characters of reference marked thereon, which form a part of this application.

This invention relates to improvements in means for connecting a plurality of gang plows to a tractor or similar source of hauling power, the principal object of the invention being to provide a means for connecting a plurality of traction gang plows to a tractor, etc., in such a manner that all the plows of the gangs will follow the proper course along the field being plowed, and will continue to dig to the proper depth when the tractor is making a turn, instead of pulling nearly out of the ground and merely scraping the surface as is now usually the case.

A further object of the invention is to so arrange the connecting means that while each plow is rigidly held against transverse movement, it may have a certain amount of vertical play relative to the others, so as to allow for different levels of ground which may be encountered in the length of the string of gangs.

Another object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view of three gang plows, showing the same as connected to a tractor.

Fig. 2 is an enlarged fragmentary top plan view of the adjacent ends of two plows, showing a means for allowing vertical play therebetween.

Fig. 3 is a side elevation of the same.

Referring now more particularly to the characters of reference on the drawings, the numerals 1 2 and 3 denote as many traction gang plows, positioned so that the long beam 4 of the plow 1 is just to one side of the short beam 5 of the plow 2 behind, and so on; this allowing the rear and front plowing members 6 and 7 respectively of the plows 1 and 2 to dig adjacent furrows.

Secured to the vertical sides at the forward ends of each beam 5 are straps 8, extending forward of the beam and suitably bent so as to be offset therefrom somewhat in the direction of the beam 4. Between such projected straps is mounted a grooved roller 9, the periphery thereof closest to the beam 5 being adapted to ride on a vertical pin or bolt 10 removably mounted in straps 11 bolted to the horizontal sides of the beam 4 and projecting beyond the rear end thereof.

These straps are spread apart somewhat beyond the beam as shown at 12, so that the roller may have a certain amount of play on the pin. A beam 13 adapted to be connected to a tractor by means of chains or link bars 14 is placed ahead of the foremost plow and extends at right angles to the direction of travel transversely of all the gangs to be connected.

The foremost plow 1 is connected to the beam by means of links 15 secured to the cross bar 16 which is at the forward end and forms a part of each gang plow.

The next plow is held to the one in front at one corner by means of the pin and roller construction just described, and is connected to the beam 13 by a rod 17 from the opposite side of the cross beam 16 of that plow. Similarly the rearmost plow 3 is connected to the beam 13 by a rod 18. The rods 17 and 18 have turnbuckles 19 interposed therein, so that the plows 2 and 3 may be accurately lined up relative to each other and to the beam.

With this construction therefore, the pulling strain of the plows comes evenly on both forward corners thereof, and each one, while held from undesired transverse movement, may have vertical play by reason of the pin and roller construction.

I have shown a three gang plow, but of course any number may be so connected in the same manner.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A means for connecting a plurality of gang plows to a tractor or the like comprising a transverse beam secured to the drawbar of the tractor and extending transversely of the line and plane of travel of all the plows, flexible connections between the adjacent ends of the beams of adjacent plows, the plows being in offset relation to each other, links connecting each forward corner of the foremost plow to the transverse beam, and a rod from the said beam to the forward corner of each of the remaining plows, said corners being the ones opposite to the flexible connections thereof with the adjacent plows.

2. A means for connecting a plurality of gang plows to a tractor or the like comprising a transverse beam secured to the drawbar of the tractor and extending transversely of the line and plane of travel of all the plows, links connecting the forward corners of the foremost plow to the transverse beam, a rod from the said beam to the corners of the remaining plows opposite to the adjacent ends thereof, and means between such adjacent ends for securing them together against transverse movement but allowing relative vertical play thereof.

3. A means for connecting a plurality of gang plows to a tractor or the like comprising a transverse beam secured to the drawbar of the tractor and extending transversely of the line and plane of travel of all the plows, the plows being arranged in alined and adjacent relation to each other, links connecting the forward corners of the foremost plow to the transverse beam, a rod from the said beam to the corners of the remaining plows opposite to the adjacent ends thereof, a vertical grooved roller mounted to one of the adjacent ends of each plow, and a vertical bolt mounted to the corresponding end of each of the other plows and bearing against the roller on the edge thereof closest to the beam on which it is mounted.

In testimony whereof I affix my signature.

ROBERT C. GRUWELL.